(12) United States Patent
Kusic

(10) Patent No.: US 7,093,791 B2
(45) Date of Patent: Aug. 22, 2006

(54) AIRCRAFT SPIRALLING MECHANISM—C

(76) Inventor: Tom Kusic, GPO Box 932, Melbourne, Vic., 3001 (AU)

( * ) Notice: Subject to any disclaimer, the term of this patent is extended or adjusted under 35 U.S.C. 154(b) by 257 days.

(21) Appl. No.: 10/762,267

(22) Filed: Jan. 23, 2004

(65) Prior Publication Data
US 2005/0116085 A1    Jun. 2, 2005

Related U.S. Application Data

(63) Continuation-in-part of application No. 09/886,639, filed on Jun. 22, 2001, now Pat. No. 6,708,923.

(51) Int. Cl.
B64C 9/08    (2006.01)

(52) U.S. Cl. .................. 244/34 R; 244/39; 244/3.1; 244/3.24

(58) Field of Classification Search .............. 244/34 R, 244/39, 67, 3.1, 3.23, 3.24, 45 A, 48, 90 R
See application file for complete search history.

(56) References Cited

U.S. PATENT DOCUMENTS

| 2,924,174 | A |   | 2/1960  | McLean             |          |
|-----------|---|---|---------|--------------------|----------|
| 3,603,533 | A |   | 9/1971  | Stripling          |          |
| 4,029,270 | A | * | 6/1977  | Niemeier           | 244/3.21 |
| 4,086,841 | A |   | 5/1978  | MacDonald          |          |
| 4,281,810 | A |   | 8/1981  | Poisson-Quinton et al. |      |
| 4,373,689 | A |   | 2/1983  | Walker             |          |
| 4,565,340 | A |   | 1/1986  | Bains              |          |
| 4,903,917 | A |   | 2/1990  | Peller et al.      |          |
| 4,964,593 | A | * | 10/1990 | Kranz              | 244/3.24 |
| 5,048,772 | A |   | 9/1991  | Wisshaupt          |          |
| 5,139,215 | A |   | 8/1992  | Peckham            |          |
| 5,176,338 | A |   | 1/1993  | Silich             |          |
| 5,186,413 | A |   | 2/1993  | Deakin             |          |
| 5,271,579 | A |   | 12/1993 | De Luca            |          |
| 5,322,243 | A |   | 6/1994  | Stoy               |          |
| 5,417,393 | A |   | 5/1995  | Klestadt           |          |
| 5,975,461 | A |   | 11/1999 | Ullrich            |          |
| 6,443,391 | B1|   | 9/2002  | Malejko et al.     |          |
| 6,511,016 | B1|   | 1/2003  | Bar et al.         |          |
| 6,644,587 | B1|   | 11/2003 | Kusic              |          |
| 6,648,433 | B1|   | 11/2003 | Kusic              |          |
| 2002/0195520 | A1 | | 12/2002 | Kusic           |          |
| 2002/0195521 | A1 | | 12/2002 | Kusic           |          |
| 2002/0195522 | A1 | | 12/2002 | Kusic           |          |

FOREIGN PATENT DOCUMENTS

| AU | 199948730 A1 | 3/2001 | |
| JP | 406026799 A * | 2/1994 | ................ 244/3.23 |
| WO | WO 02/102660 A1 | 12/2002 | |

* cited by examiner

Primary Examiner—Timothy D. Collins

(57) ABSTRACT

An aircraft 1 with a spiral inducing assembly 2 which is capable of inducing the aircraft to travel in a continuous spiralling motion without the aircraft rolling. Two fins 6 and 17 are attached to a tube 3a that is able to rotate around the encircled part of the fuselage. The fins 6, 17 are able to rotate in a pivoting manner on the rotatable tube 3a with respect to the rotatable tube 3a, thereby changing their pitch relative to the longitudinal axis of the rotatable tube 3a. Rotation of the rotatable tube is achieved by using an electric motor 3b turning a wheel 3c. The wheel 3c makes contact with the rotatable tube. When pitched at an angle to the longitudinal axis in unison, both fins 6, 17 would exert a lateral force on the rotatable tube 3a. But as the rotatable tube is pushed sideways, it rotates, and hence the lateral direction of push constantly revolves, causing a spiralling motion of the aircraft when in flight. The rotation of one fin causes the rotation of another fin.

20 Claims, 11 Drawing Sheets

AIRCRAFT SPIRALLING MECHANISM—C

CROSS REFERENCE TO RELATED APPLICATIONS

This is a continuation-in-part patent application, being a continuation-in-part of the U.S. patent application Ser. No. 09/886,639, filed on Jun. 22, 2001 now U.S. Pat. No. 6,708,923.

STATEMENT REGARDING FEDERALLY SPONSORED RESEARCH OR DEVELOPMENT

Not applicable.

REFERENCE TO SEQUENCE LISTING

Not applicable.

BACKGROUND OF THE INVENTION

1. Field of the Invention

This invention is related to the field of aviation dealing with missiles and military attack airplanes.

The aim of this invention is to provide an aircraft that has higher chance of surviving attacks from anti-aircraft weapons when flying over enemy territory than aircraft currently in use. The aircraft according to this invention is fitted with a mechanism that enables the aircraft to travel in a continuous spiralling motion while flying over enemy teritorry, without the need for a pilot to make continues control adjustments. The mechanism is such that once activated, the spiralling motion is automatic. The mechanism can aslo be dis-engaged by a pilot when so desired. The spiralling motion is achieved during flight without having to roll the aircraft.

While a pilot flying a conventional aircraft such as a jet fighter could make the conventional aircraft fly in a spiralling motion, this could only be achieved if the pilot kept making continuous control changes with his own arm. This could become quite tiresome and strenuous after a while and would require continued concentration, if the spiralling was achieved without rolling the aircraft. Rolling the aircraft, as in the form of a barrel roll, may seem like an easy alternative, but continuous rolling would make a pilot dizzy after a while, leading to loss of control, and if close to the ground, a potential for a crash. A continuous rolling motion would also make it hard for the pilot to observe enemy territory, navigate and make target selection. That is, using a sustained rolling motion in order to achieve a prolonged spiralling motion would not be practical.

The aircraft in this invention would allow the pilot to operate conventional controls in a conventional manner, as when flying in a smooth manner, while the aircraft continued to travel in a spiralling motion. The advantage of this is that the pilot would be able to continue to observe enemy territory and would be free to concentrate on targeting enemy sites while the aircraft flew in an evasive manner.

2. Description of the Related Art

U.S. Pat. No. 5,322,243 in the name of Stoy shows a missile with variable pitch fins on a rotatable tube that are moved by independent actuators, and a computer to control the operation of the actuators. While the intention of Stoy wasn't to provide a missile that could travel in a continuous spiralling motion, such a motion could be achieved by the missile shown in Stoy's patent with appropriate programming of the controlling computer. The current invention provides a mechanical means for inducing a spiralling motion in an aircraft that does not need a computer to control the position of the fins on a rotatable tube to induce a spiralling motion in the aircraft.

BRIEF SUMMARY OF THE INVENTION

In this invention the spiralling motion of a fast flying aircraft is achieved by using moveable fins on a rotatable tube, with the tube encircling a part of the main body aircraft and with the tube able to rotate around the encircled part of the aircraft.

The fins are attached to the rotatable tube so that they can be rotated in a pivoting manner relative to the rotatable tube. That is, if the rotatable tube was kept in a fixed position on the airplane so as not to rotate, the fin movement would resemble the movement of canards on aircraft such as the Eurofighter and the recent version of the Sukhoi Su-37. The fins would turn in a pitch altering motion in the same direction. With the fins horizontal, the aircraft would be allowed to fly smoothly. When the fins are rotated from the horizontal position, they would act to push the aircraft in a similar manner to the way that canards would (if positioned on the forward part of the aircraft).

For the aircraft to enter a spiralling motion, the fins would need to revolve around the body of the aircraft so that the aircraft is pushed in changing directions. In the invention this is achieved by using the rotatable tube that allows the fins to revolve around the main body of the aircraft—using the rotatable tube as a means of travelling around a part of the main body of the aircraft.

To rotate the rotatable tube, and electric motor attached to the main body of the aircraft can be used, rotating a wheel that makes contact with the rotatble tube. As the wheel is rotated by the electric motor, the wheel rotates the rotatable tube. Another way is to use protruding section that prodrudes from the tube which could force the tube to rotate. The protruding section would be shaped so that dynamic action by air on the protruding section could force the tube to rotate during flight of the aircraft. The protruding section could be in the form of a fin fixed in position, or a fin that is rotatable relative to the tube.

Although the aircraft could be in the form of a jet propelled airplane, it could be in the form of any one of a range of aircraft such as guided missiles and unguided missiles. It could also be in the form of unpropelled aircraft such as gliders or winged bombs that are designed to glide to a target.

BRIEF DESCRIPTION OF THE SEVERAL VIEWS OF THE DRAWINGS

Embodiments of the invention will now be described by way of example with reference to the accompanying drawings, of which.

DETAILED DESCRIPTION OF THE DRAWINGS

Figure 1:
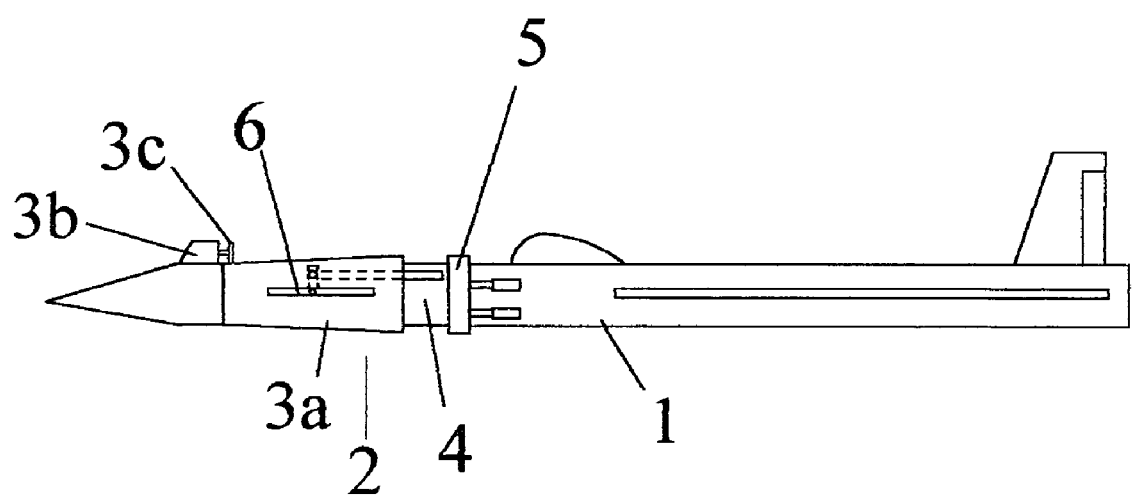
FIG. 1 shows the left side view of an aircraft in the form of a jet airplane comprising a spiral inducing assembly.

FIG. 1 shows one form of the aircraft 1 as a jet propelled airplane 1, fitted with a spiral inducing assembly 2.

Referring to FIG. 1, a rotatable tube 3a forming part of the spiral inducing assembly 2 can be seen encircling part of the fuselage 4 of the airplane 1. The fuselage has a fore end and aft end. Referring to this tube 3a as the primary tube 3a, the primary tube 3a is able to rotate around the part of the fuselage encircled by the primary tube. An electric motor 3b comprising a wheel 3c is used to rotate the primary tube when the spiral inducing mechanism is activated. The wheel is in contact with the primary tube and the wheel is rotated by the electric motor. The primary tube is shown as being narrower in the front than at the rear. Also shown is another tube 5 that is fitted to the airplane such that it encircles part of the fuselage 4 of the airplane. Referring to this tube 5 as the activation tube 5, the activation tube 5 is fitted so that it can be moved in a forward direction relative to the part of the fuselage 4 encircled by the activation tube and then back to its original position on the fuselage. FIG. 1 also shows the edge of one horizontal fin 6 that is connected to the outside of the primary tube 3a. The fin 6 is connected to the outside of primary tube 3a such that it can rotate in a pivoting manner as shown in FIG. 3.

Figure 2:
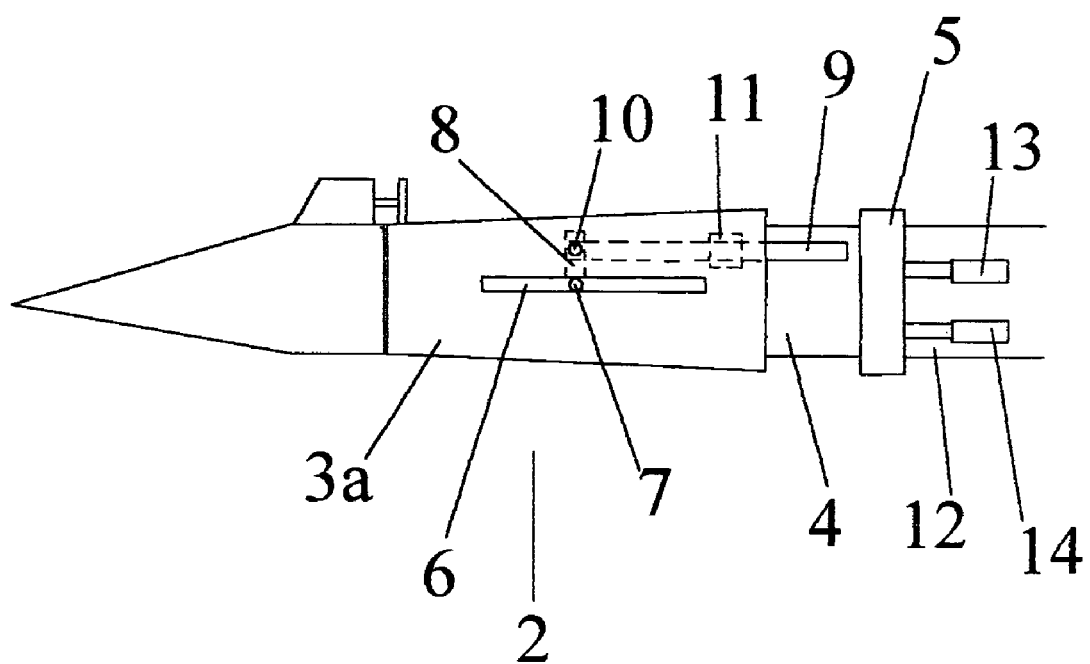
FIG. 2 shows an enlarged view of the spiral inducing assembly of FIG. 1.

FIG. 2 shows an enlarged illustration of the left side of the spiral inducing assembly 2. The fin 6 in FIG. 2 is connected to the outside of the primary tube 3a by a connecting joint which is in the form of a connecting rod 7. Extended from the connecting rod 7 in FIG. 2 is a protruding section 8 which is used to rotate the connecting rod 7. Rotation of the connecting rod 7 causes the fin 6 to rotate in a pivoting manner around the connecting rod 7 (in the manner shown in FIG. 3). Linked to the protruding section 8 in FIG. 2 is a stem 9. Referring to this stem 9 as an activation stem 9, the activation stem 9 is used as a means for pushing the protruding section 8 such that when the protruding section 8 is pushed, the protruding section 8 forces the connecting rod 7 to rotate around the longitudinal axis of the connecting rod 7. The activation stem 9 is linked to the protruding section 8 by a rivet 10. The activation stem 9 is shown as being fitted on the inside of the primary tube 3a and is supported inside the primary tube 3a by a retaining bracket 11. The retaining bracket 11 is rigidly joined to the inside of the primary tube but is channelled to allow the activation stem 9 to move longitudinally between the retaining bracket 11 and the primary tube 3a. The activation stem 9 is allowed to protrude rearward from the primary tube so that it can be reached by the activation tube 5 when the activation tube 5 is moved forward on the fuselage 4. The activation tube 5 is forced to move forward by an activation mechanism 12 consisting of hydraulic actuators 13 and 14.

Figure 3:
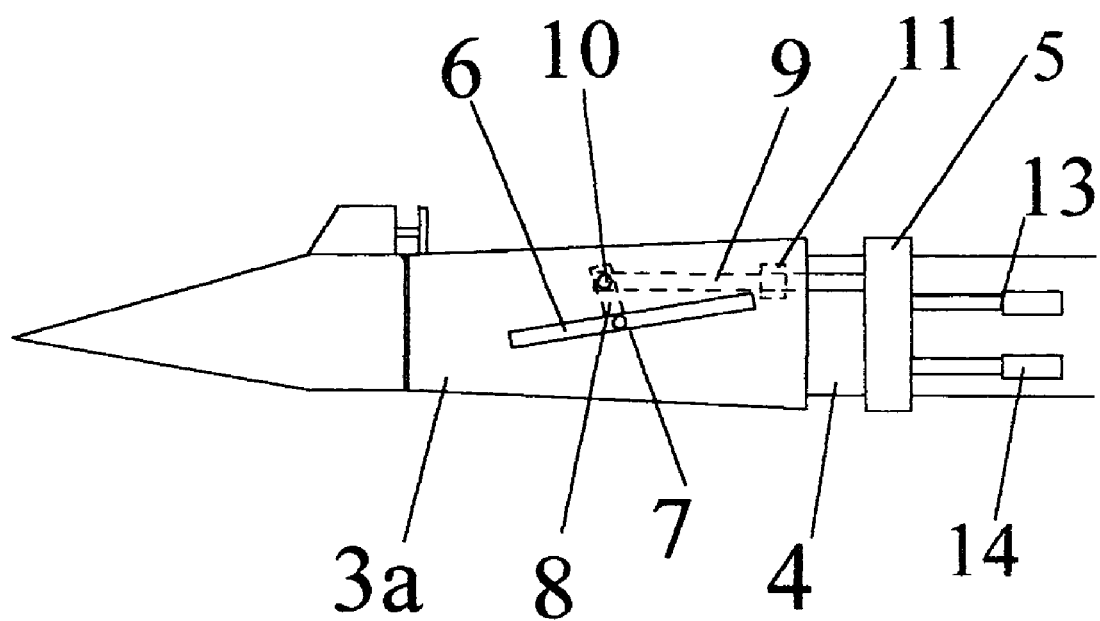
FIG. 3 shows the left side of the spiral inducing assembly of FIG. 1 after the spiral inducing assembly has been activated to cause a spiralling motion to occur.

FIG. 3 shows that as the activation tube 5 is forced to move forward on the fuselage 4 when the hydraulic actuators 13 and 14 extend, it eventually makes contact with the activation stem 9. As the activation tube 5 is forced to move further forward, it pushes the activation stem 9 forward on primary tube. As the activation stem 9 is pushed forward, the activation stem pushes against the protruding section 8 and moves the protruding section 8, thereby rotating the fin 6 around the connecting rod 7 in a pivoting manner.

In FIG. 3 a rivet 10 is shown connecting the activation stem 9 to the protruding section 8, which allows movement between the activation stem 9 and the protruding section 8. The retaining bracket 11 keeps the activation stem from moving laterally around the primary tube. The retaining bracket 11 however does allow longitudinal sliding movement of the activation stem 9 so that it can be pushed and moved by the activation tube 5.

Figure 4:
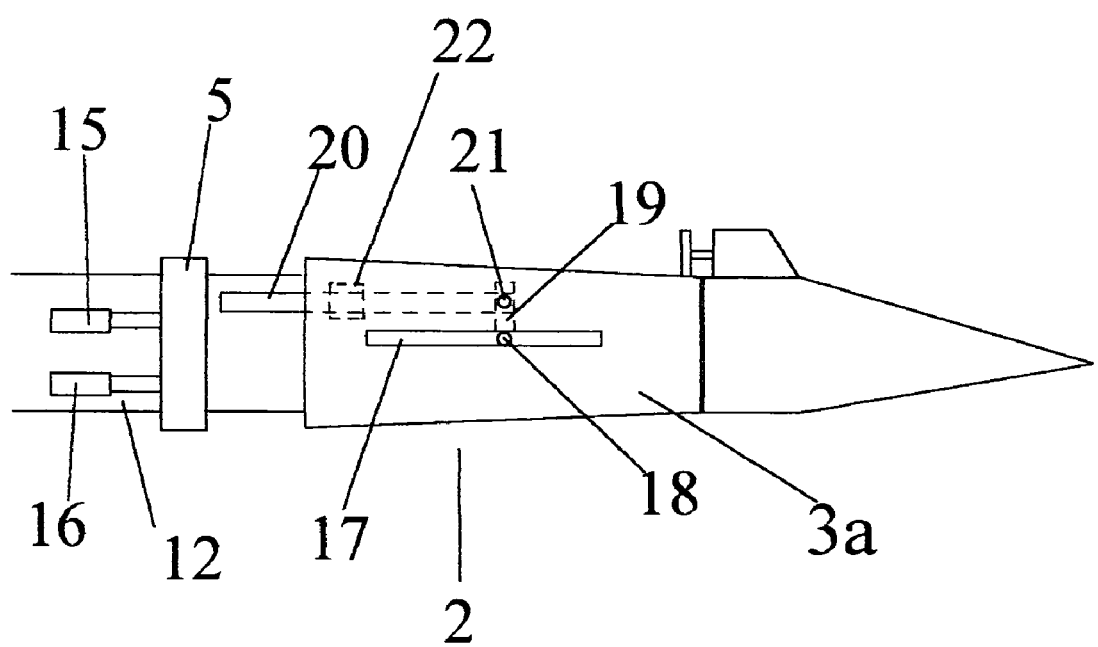
FIG. 4 shows the right side of the spiral inducing assembly of FIG. 1.

FIG. 4 shows the right side of the spiral inducing assembly 2 of FIG. 1. Shown is another fin 17, another connecting joint in the form of a connecting rod 18 that connects the fin 17 to the outside of the primary tube 3a. Another protruding section 19 is used to rotate the connecting rod 18, and the activation stem 20 is used to push the protruding section 19, with the activation stem 20 linked to the protruding section 19 by a rivet 21. Also visible in FIG. 4 is the activation tube 5. The connecting rod 18 allows the fin 17 to rotate in a pivoting manner. Another retaining bracket 22 is shown supporting the respective activation stem 20. FIG. 4 shows the hydraulic actuators 15 and 16 located on the right side of the spiral inducing assembly 2 which also form part of the activation mechanism 12 by which the activation tube 5 is forced to move. When the hydraulic actuators 13 14 15 and 16 are forced to extend as hydraulic pressure is applied to them, they force the activation tube 5 to move forward as shown in FIG. 3.

Thus, it can be seen from FIGS. 1, 2, 3 and 4 that the activation tube 5, the activation stems 9 and 20, retaining brackets 11 and 22, protruding sections 8 and 19, rivets 10 and 21 used to connect the activation stems 9 and 20 to respective protruding sections 8 and 19, the connecting joints 7 and 18 in the form of connecting rods 7 and 18, and the activation mechanism 12 used to move the activation tube 5 consisting of the hydraulic actuators 13, 14, 15 and 16, collectively form a fin rotating mechanism, by which fin rotating mechanism the fins can be rotated symmetrically in the same direction, so that the force exerted on the primary tube by one fin can be overcome by the force exerted on the primary tube by another fin.

Figure 5:
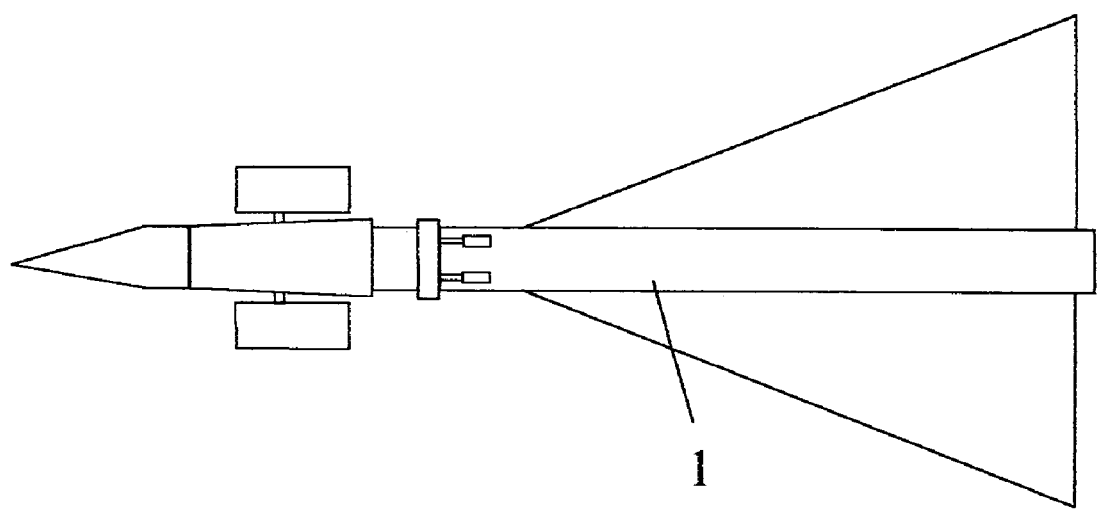
FIG. 5 shows the airplane of FIG. 1 as viewed from underneath the airplane.

FIG. 5 shows the airplane 1 of FIG. 1 from underneath.

Figure 6:
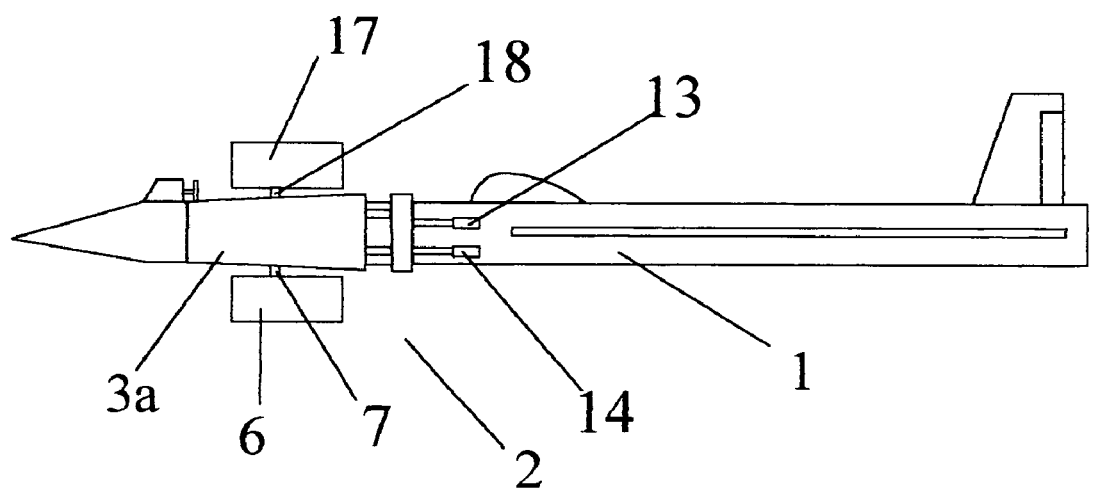
FIG. 6 shows the spiral inducing assembly of FIG. 4 in an activated state, and after the rotatable tube has been rotated.

FIG. 6 shows the spiral inducing assembly of FIG. 4 with the fins 6 and 17 of FIG. 4, and with the primary tube 3a in a state of rotation. It can be seen comparing FIG. 5 with FIG. 6 how the lateral forces on the airplane would be constantly changing, enabling the spiral inducing assembly 2, to force the airplane 1 to travel in a continuous spiralling motion.

Figure 7:
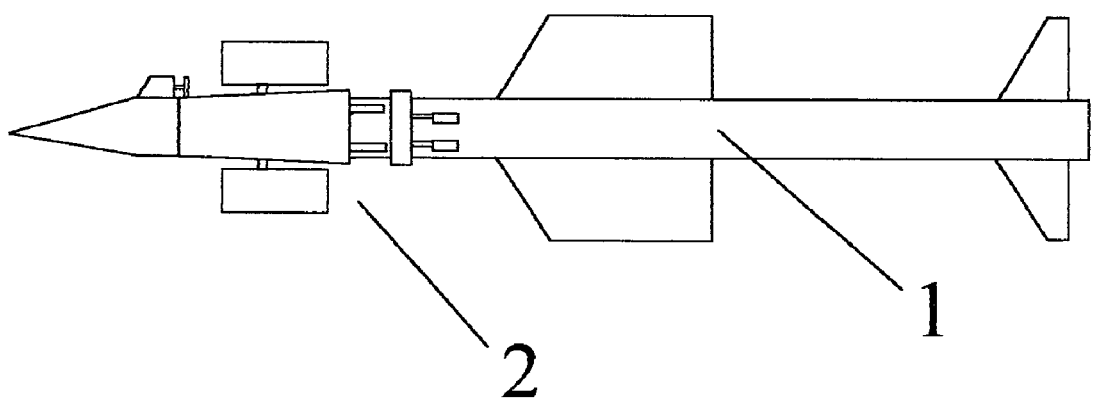
FIG. 7 shows an aircraft according to this invention in the form of a missile.

Looking at the fins 6 and 17 shown in FIG. 6 it can be seen that the rear section of each fin behind the respective connecting rods 7 and 18 is greater than the section of each fin in front the respective connecting rods 7 and 18. This is deliberate. This is used to allow the fins to adopt a horizontal position when hydraulic pressure is released from the hydraulic actuators 13, 14 (and 15 and 16 of FIG. 4) allowing the activation tube 5 to retreat away from the primary tube 3a. Aerodynamic forces are in effect used to allow the fins to return to a resting horizontal position, allowing the airplane to re-commence a smooth FIG. 7 shows an aircraft according to this invention in the form of a missile with a spiral inducing assembly 2 of FIG. 1.

Figure 8:
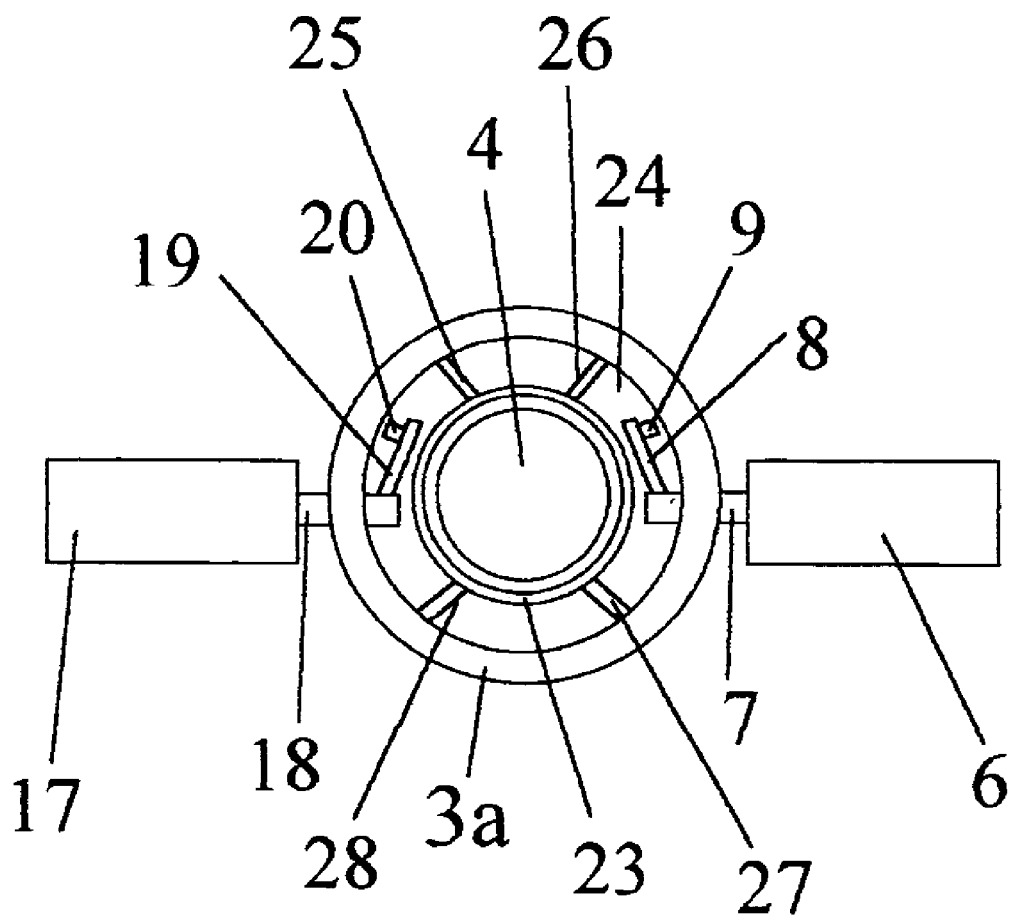
FIG. 8 shows a cross-sectional view of the spiral inducing assembly of FIG. 1 as viewed from the front of the airplane.

FIG. 8 shows a cross-sectional view of the spiral inducing assembly of FIG. 1 as viewed from the front of the airplane. Shown here is the primary tube 3a, the fins 6 and 17, the fuselage 4 of the airlane, the activation stems 9 and 20, linked by rivets to the protruding sections 8 and 19 respectively, the connecting rods 7 and 18 penetrating the primary tube 3a, and with the protruding sections 8 and 19 screwed in the connecting rods 7 and 18 respectively. FIG. 8 shows a way of supporting the primary tube 3a. Shown is a tube of smaller diameter 23 than the primary tube 3a. This smaller tube 23 is a supporting tube in that it is used to support the primary tube 3a. It has a smaller diameter than the primary tube 3a to provide a gap 24 between the primary tube 3a and the supporting tube 23. The gap 24 is used to allow freedom of movement to the protruding sections 8 and 19, and the activation stems 9 and 20 shown positioned inside the primary tube 3a. Bolts 25, 26, 27 and 28 are used to join the primary tube 3a to the supporting tube 23. The supporting tube 23 is able to rotate around the encircled part of the fuselage 4.

Figure 9:
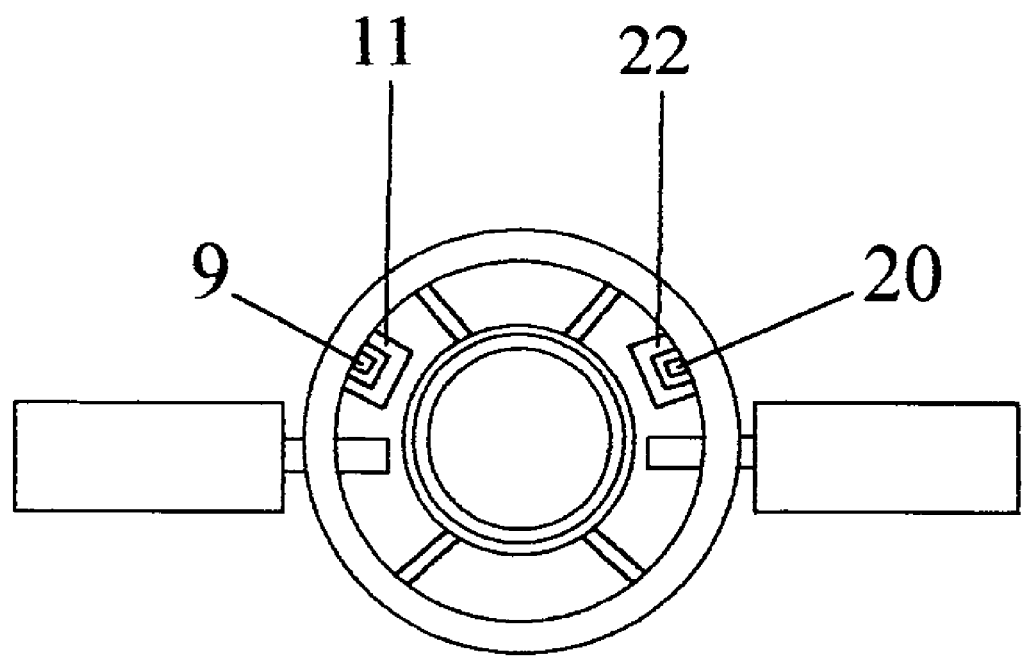
FIG. 9 shows a cross-sectional view of the spiral inducing assembly as viewed from behind the spiral inducing assembly.

FIG. 9 shows a cross-sectional view of the spiral inducing assembly as viewed from behind the spiral inducing assembly. Shown in FIG. 6 are the rear ends of the activation stems 9 and 20, and the retaining brackets 11 and 22 that support the activation stems 9 and 20, and prevent uncontrolled lateral movement of the activation stems 9 and 20.

Figure 10:
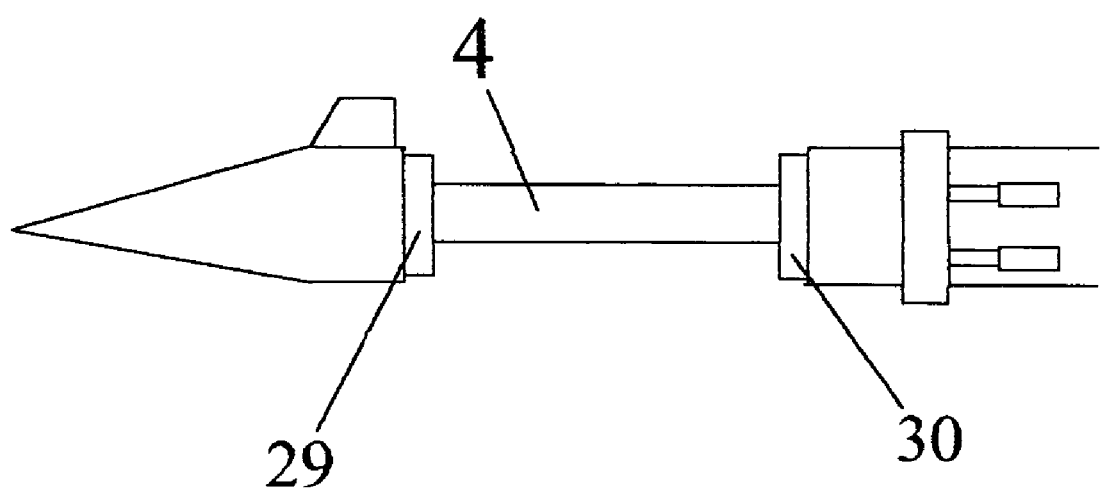
FIG. 10 shows the left side of the front of the fuselage of the airplane of FIG. 1.

FIG. 10 shows a side cutting of the part of the fuselage 4 encircled by the primary tube 3a of FIG. 1. The encircled part of the fuselage 4 can be seen to be narrower than the rest of the fuselage 4. Thrust bearings 29 and 30 are positioned on the narrowed section of fuselage 4. The thrust bearings are used to prevent the primary tube moving longitudinally relative to the fuselage 4.

Figure 11:
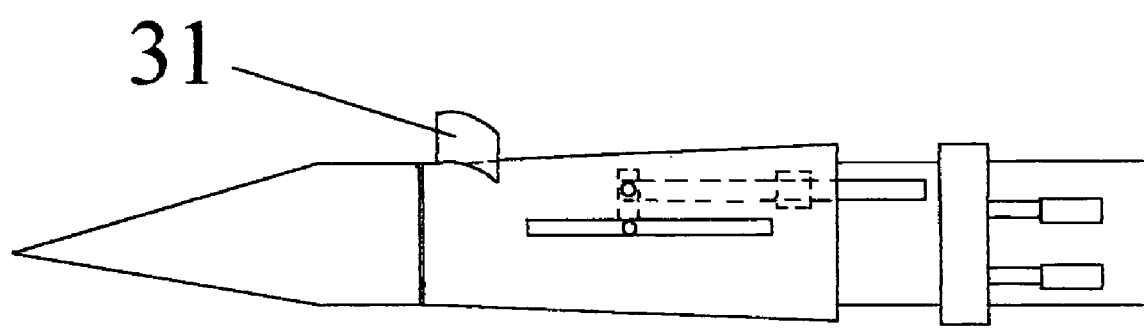
FIG. 11 shows a protruding section in the form of a fin being used to rotate the rotatable tube of the spiral inducing assembly.

FIG. 11 shows a variation of the spiral inducing assembly of FIG. 2. The electric motor has been replaced with a protruding section in the form of a fin that protrudes from the primary tube, and is angled so as to force the primary tube to rotate during flight.

The invention claimed is:

1. An aircraft comprising a tube, which tube encircles part of the aircraft and is able to rotate relative to the encircled part of the aircraft, and which aircraft comprises a means to rotate the tube relative to the encircled part of the aircraft, which aircraft also comprises a plurality of fins, which fins are connected to the tube such that the fins can be rotated in a pivoting manner relative to the tube, and such that the fins can be rotated in the said pivoting manner in the same direction relative to the tube, and which aircraft also comprises a fin rotating mechanism by which fin rotating mechanism the fins can be rotated in the said pivoting manner in the same direction as each other relative to the tube and such that rotation of one fin in a pivoting manner relative to the tube causes rotation of another fin relative to the tube in the same direction as a direction of rotation of the said one fin relative to the tube.

2. An aircraft comprising a tube, which tube encircles part of the aircraft and is able to rotate relative to the encircled part of the aircraft, and which aircraft comprises a means to rotate the tube relative to the encircled part of the aircraft, which aircraft also comprises a plurality of fins, which fins are connected to the tube such that the fins can be rotated in a pivoting manner relative to the tube, and such that the fins can be rotated in the said pivoting manner in the same direction relative to the tube, and which aircraft also comprises a fin rotating mechanism by which fin rotating mechanism the said fins can be rotated in the said pivoting manner in the same direction as each other relative to the tube and such that mechanical action by the fin rotating mechanism to pivotally rotate one fin relative to the tube can cause rotation of another fin relative to the tube in the same direction as a direction of rotation of the said one fin relative to the tube.

3. An aircraft comprising a tube, which tube encircles part of the aircraft and is able to rotate relative to the encircled part of the aircraft, and which aircraft comprises a means to rotate the tube relative to the encircled part of the aircraft, which aircraft also comprises a plurality of fins, which fins are connected to the tube such that the fins can be rotated in a pivoting manner relative to the tube, and which aircraft also comprises a fin rotating mechanism by which fin rotating mechanism the fins can be rotated in the said pivoting manner such that flight of the aircraft rotation of one fin relative to the tube could create a force that could cause the tube to rotate in one direction as a result of dynamic action by air on the one fin if rotation of the tube was not restricted, and which fin if rotation mechanism is such that the said rotation of the one fin relative to the tube causes rotation of another fin relative to the tube such that during flight of the aircraft the another fin could force the tube to rotate relative to the encircled part of the aircraft in a direction that is opposite to the said one direction as a result of dynamic action by air on the another fin if no other fin exerted a force on the tube and rotation of the tube was not otherwise restricted.

4. An aircraft comprising a tube, which tube encircles part of the aircraft and is able to rotate relative to the encircled part of the aircraft, and which aircraft comprises a means to rotate the tube relative to the encircled part of the aircraft, which aircraft also comprises a plurality of fins, which fins are connected to the tube such that the fins can be rotated in a pivoting manner relative to the tube, and which aircraft also comprises a fin rotating mechanism by which fin rotating mechanism the fins can be rotated in the said pivoting manner by means of mechanical action by the fin rotating mechanism such that during flight of the aircraft rotation of one fin relative to the tube could create a force that could cause the tube to rotate in one direction as a result of dynamic action by air on the one fin if rotation of the tube was not restricted, and which fin rotating mechanism is such that the said mechanical action by the fin rotating mechanism to rotate the one fin relative to the tube can cause rotation of another fin relative to the tube such that during flight of the aircraft the another fin could force the tube to rotate relative to the encircled part of the aircraft in a direction that is opposite to the said one direction as a result of dynamic action by air on the another fin if no other fin exerted a force on the tube and rotation of the tube was not otherwise retricted.

5. The aircraft of claim 1 wherein the rotation of the fins in the said same direction is such that the rotation of the fins is substantially in the same direction relative to the tube.

6. The aircraft of claim 2 wherein the rotation of the fins in the said same direction is such that the rotation of the fins is substantially in the same direction relative to the tube.

7. The aircraft of claim 1 wherein the said meand to rotate the tube relative to the encircled part of the aircraft comprises an electric motor connected to the aircraft such that the electric motor is able to rotate the tube relative to the encircled part of the aircraft.

8. The aircraft of claim 2 wherein the said means to rotate the tube relative to the encircled part of the aircraft comprises an electric motor connected to the aircraft such that the electric motor is able to rotate the tube relative to the encircled part of the aircraft.

9. The aircraft of claim 3 wherein the said means to rotate the tube relative to the encircled part of the aircraft comprises an electric motor connected to the aircraft such that the electric motor is able to rotate the tube relative to the encircled part of the aircraft.

10. The aircraft of claim 4 wherein the said means to rotate the tube relative to the encircled part of the aircraft comprises an electric motor connected to the aircraft such that the electric motor is able to rotate the tube relative to the encircled part of the aircraft.

11. The aircraft of claim 5 wherein the said means to rotate the tube relative to the encircled part of the aircraft comprises an electric motor connected to the aircraft such that the electric motor is able to rotate the tube relative to the encircled part of the aircraft.

12. The aircraft of claim 6 wherein the said means to rotate the tube relative to the encircled part of the aircraft comprises an electric motor connected to the aircraft such that the electric motor is able to rotate the tube relative to the encircled part of the aircraft.

13. The aircraft of claim 1 wherein the said means to rotate the tube relative to the encircled part of the aircraft comprises a protruding section,
which protruding section protrudes outward from the tube, and which protruding section is such that during flight by the aircraft, dynamic action by air on the protruding section can cause the tube to rotate relative to the encircled part of the aircraft.

14. The aircraft of claim 2 wherein the said means to rotate the tube relative to the encircled part of the aircraft comprises a protruding section,
which protruding section protrudes outward from the tube, and which protruding section is such that during flight by the aircraft, dynamic action by air on the protruding section can cause the tube to rotate relative to the encircled part of the aircraft.

15. The aircraft of claim 3 wherein the said means to rotate the tube relative to the encircled part of the aircraft comprises a protruding section,
which protruding section protrudes outward from the tube, and which protruding section is such that during flight by the aircraft, dynamic action by air on the protruding section can cause the tube to rotate relative to the encircled part of the aircraft.

16. The aircraft of claim 4 wherein the said means to rotate the tube relative to the encircled part of the aircraft comprises a protruding section,
which protruding section protrudes outward from the tube, and which protruding section is such that during flight by the aircraft, dynamic action by air on the protruding section can cause the tube to rotate relative to the encircled part of the aircraft.

17. The aircraft of claim 5 wherein the said means to rotate the tube relative to the encircled part of the aircraft comprises a protruding section,
which protruding section protrudes outward from the tube, and which protruding section is such that during flight by the aircraft, dynamic action by air on the protruding section can cause the tube to rotate relative to the encircled part of the aircraft.

18. The aircraft of claim 6 wherein the said means to rotate the tube relative to the encircled part of the aircraft comprises a protruding section,
which protruding section protrudes outward from the tube, and which protruding section is such that during flight by the aircraft, dynamic action by air on the protruding section can cause the tube to rotate relative to the encircled part of the aircraft.

19. The aircraft of any one of claims 1, 2, 3-8, 9-14, 15-18 wherein the said aircraft is a missile.

20. The aircraft of any one of claims 1, 2, 3-8, 9-14, 15-18 wherein the said aircraft is an airplane.

* * * * *